United States Patent [19]

Kawamoto et al.

[11] Patent Number: 5,419,406
[45] Date of Patent: May 30, 1995

[54] DRIVE SYSTEM FOR ELECTRIC CAR

[75] Inventors: Mutsumi Kawamoto, Nagoya; Masahiro Hasebe, Anjo; Yoshinori Miyaishi, Okazaki, all of Japan

[73] Assignee: Aisin AW Co., Ltd., Japan

[21] Appl. No.: 964,630

[22] Filed: Oct. 23, 1992

[30] Foreign Application Priority Data

| Oct. 24, 1991 | [JP] | Japan | 3-303833 |
| Oct. 24, 1991 | [JP] | Japan | 3-303837 |
| Mar. 10, 1992 | [JP] | Japan | 4-092325 |
| Mar. 19, 1992 | [JP] | Japan | 4-092324 |

[51] Int. Cl.⁶ .................................. B60K 1/02
[52] U.S. Cl. ........................ 180/65.6; 180/60; 475/5
[58] Field of Search .............. 180/65.5, 65.6, 65.1, 180/60, 216, 242, 297; 310/112, 148; 475/5, 6, 150

[56] References Cited

U.S. PATENT DOCUMENTS

| 659,012 | 10/1900 | Bachelle | 180/60 |
| 672,713 | 4/1901 | Sanchis | 180/65.6 X |
| 1,129,036 | 2/1915 | Hoffmann | 310/112 |
| 1,313,937 | 8/1919 | Brinton | 180/65.6 X |
| 1,780,370 | 11/1930 | Tenney | 180/65.6 X |
| 1,858,506 | 5/1932 | Jacobs | 180/65.6 |
| 3,439,767 | 4/1969 | Lynes et al. | 180/60 |
| 3,770,074 | 11/1973 | Sherman | 180/65.6 |
| 4,418,777 | 12/1983 | Stockton | 180/65.6 |
| 5,127,485 | 7/1992 | Wakuta et al. | 180/65.6 X |

FOREIGN PATENT DOCUMENTS

| 17995 | 11/1902 | United Kingdom | 180/60 |
| 2034647 | 6/1980 | United Kingdom | 180/65.6 |

Primary Examiner—Brian L. Johnson
Attorney, Agent, or Firm—Lorusso & Loud

[57] ABSTRACT

A drive system for an electric vehicle includes a plurality of motors and reduction gearing, including planetary gearing, for power transmission from the motors to the wheels of the electric vehicle. The motors and the reduction gearing are coaxially arranged so that they can be mounted in axial alignment with and between the right-hand and left-hand wheels of the electric vehicle.

6 Claims, 7 Drawing Sheets

DRIVE SYSTEM FOR ELECTRIC CAR

BACKGROUND OF THE INVENTION

The present invention relates to a drive system for an electric car and, more particularly, to a drive unit which can be arranged coaxially with the wheels of the car.

DESCRIPTION OF THE PRIOR ART

Electric vehicles are gaining favor because of air pollution due to exhaust gases. Most drive systems for electric vehicles derive from mere replacement of an internal combustion engine with an electric motor and are not efficient in providing a desired drive force, in the size and weight of the system or in mountability.

The foremost problem associated with electric vehicles is how to extend mileage. To address this problem, it is essential to reduce the size and weight of the drive system while retaining a high drive efficiency. It is conceivable to increase the torque by combining a small-sized drive motor with a reduction gear unit and to arrange the combination coaxially with the car wheels, to thereby reduce the size and weight while retaining a high drive efficiency. If, however, a drive system having a single motor as its prime mover is arranged coaxially with the wheels, the motor diameter has to be enlarged, making it difficult to retain minimum road clearance. On the other hand, if a counter gear or the like is used to arrange the motor and the wheels in parallel so as to retain the minimum road clearance, the radial load is excessively increased by the tangential force of the gear, thus enlarging the size of the system, reducing the transmission efficiency, reducing rigidity and so on.

SUMMARY OF THE INVENTION

With this background in mind, therefore, an object of the present invention is to provide a drive system for an electric car which has an improved cooling capacity and reduced diameters of its individual motors, thus allowing the motors to be arranged in axial alignment with the axes of the wheels of the vehicle, while retaining a high driving efficiency.

In order to achieve the above object, according to the present invention, there is provided a drive system for an electric vehicle which includes a plurality of motors and reduction gear means including planetary gearing for transmitting power from the motors to the wheels of the electric vehicle. One important improvement provided by this drive system is that the motors and the reduction gear mechanisms are so coaxially arranged (axially aligned) that they can be mounted in axial alignment with and between the right-hand and left-hand wheels of the electric vehicle.

The electric vehicle drive system according to the present invention is able, by using a plurality of motors, not only to reduce the diameters of the individual motors but also to position their coil portions, which act as heat sources, to improve their individual heat capacity and the heat transfer to the motor casing to improve the cooling performance so that driving force can be retained. Thanks to the positioning of the coil portions, their surface areas are effectively increased to improve the radiation effect. If cooling with air or oil is combined with the increase in the surface areas, the cooling effect can be further improved so that a higher driving force can be achieved for a given set of running conditions than that in which the overload regions of the motors are used.

BRIEF DESCRIPTION OF THE DRAWINGS

Other objects, features and advantages of the present invention will become apparent from the following description made with reference to the accompanying drawings, in which.

DESCRIPTION OF THE PREFERRED EMBODIMENTS

The electric vehicle drive system of the present invention will be exemplified in the following with reference to the accompanying drawings.

Figure 1:
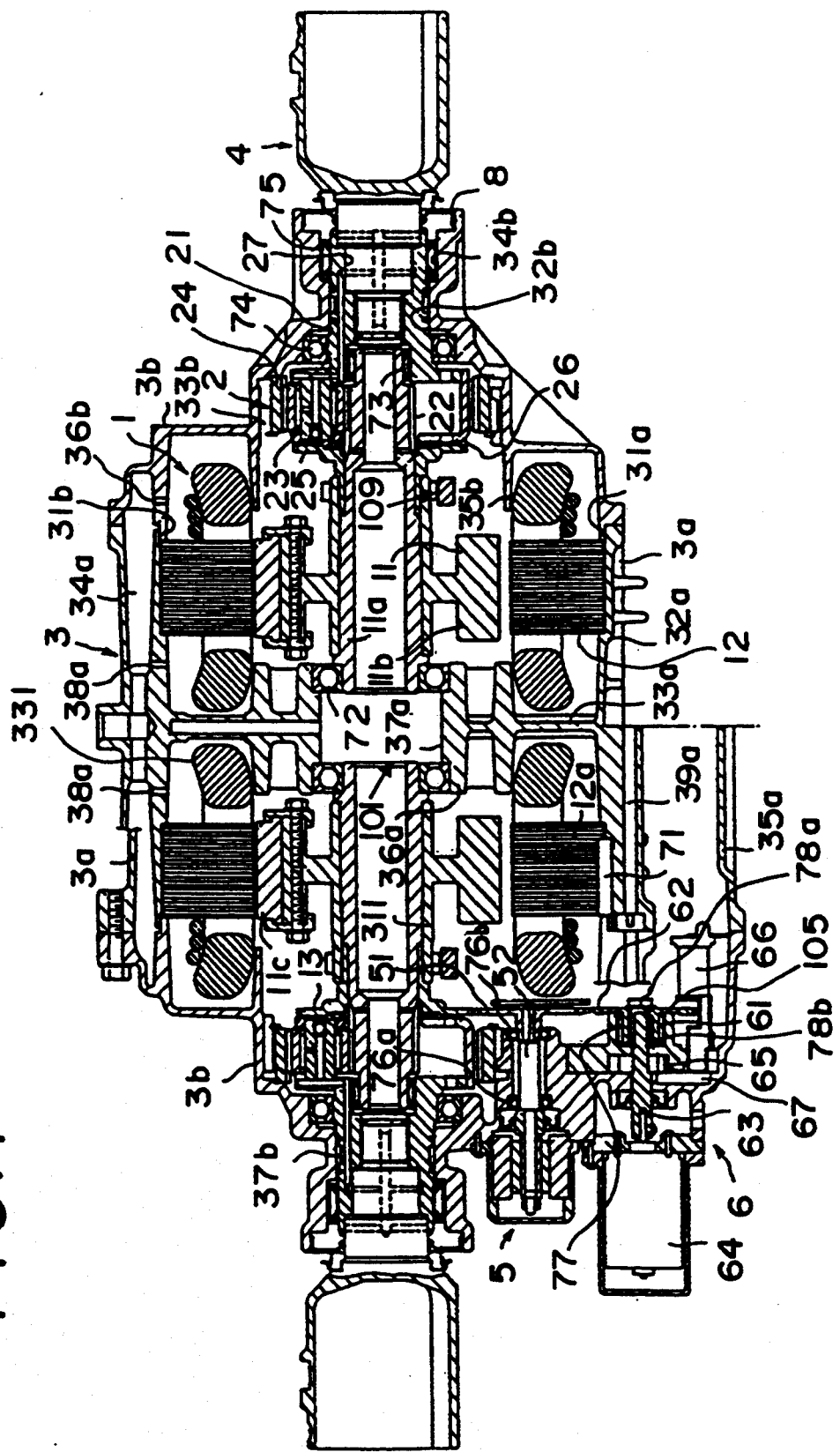
FIG. 1 is a cross-sectional view showing a first embodiment of the present invention.

FIG. 1 is a sectional view (having different sections at the right-hand and left-hand sides of the drawing) of a first, small-sized embodiment of a drive system in accordance with the present invention. In this embodiment, there are mounted in a common casing 3 a pair of motors 1 each composed of a rotor 11 and a stator 12 and a pair of reduction gear units 2 composed of planetary gears connected to the motors 1 for power transmission.

The rotor 11 and stator 12 of the motor 1 are mounted in the casing 3. The casing 3 includes one casing section 3a having an opening 31a at one end, a circumferential wall 32a supporting the outer circumference of a core 12a of the stator 12, locked against rotation by a key 71, and an end wall supporting one end of a spindle 11a of the rotor 11 through a ball bearing 72. Casing 3 also includes a casing section 3b having an opening 31b at one end, and a circumferential wall 32b supporting an output shaft 21 of the reduction gear unit 2. Incidentally, in this embodiment, casing 3 is divided into two integral sections by a shared end wall 33a. This construction contributes to a reduction in the axial length and weight of the casing 3 in the present embodiment.

The casing sections 3a and 3b are joined to each other by means of bolts by mating their openings 31a and 31b with each other and by aligning the spindle 11a and the output shaft 21. The other end of the spindle 11a of the rotor 11 extends through the casing section 3b and is received in the bore of the output shaft 21 through a roller bearing 73. The core 12a of the stator 12 is sandwiched between the two casing sections 3a and 3b such that its one end abuts against a step on the circumferential wall of the casing section 3a whereas its other end abuts against a casing end face surrounding the opening 31b of the casing section 3b.

The individual components will now be described in more detail. The casing 3 is of a generally cylindrical shape, in which inner and outer circumferential walls define a header, i.e. circumferential wall oil passage 34a, therebetween in an upper portion of the casing. At the bottom of the casing 3 an outer wall 35a extends tangentially from the side and below the circumferential wall so as to form an oil sump. A flange 36a extends axially from the center wall 33a to support one end of the spindle 11a. An axial bore 37a is defined by the inner circumference of a flange to provide communication between the two halves of casing 3. The casing section 3b has a generally cylindrical shape, in which the upper portion of the circumferential wall is also formed with inner and outer double walls. This casing section 3b is formed with a radially reduced reduction gear unit mounting portion 33b and an output shaft receiving bore portion 34b surrounded by the circumferential wall 32b. In this embodiment, the two casing sections 3a and 3b have their openings 31a and 31b faucet-joined to each other so as to facilitate the alignment of the spindle 11a and the output shaft 21. A guide 35b extends coaxially with the casing sections 3a and 3b and surrounds the spindle 11a to guide the oil for cooling the coil 12b down along the coil encircling the stator 12.

The motor 1 includes the stator 12 composed of a field coil 331 and the core 12, and the rotor 11 equipped with permanent magnets providing six poles on its outer circumference. The stator 12 is fitted and fixed to the circumferential wall of the casing 3 by locking the outer circumference of the core 12a against rotation by means of a key. The rotor 11 has its rotor shaft 311 splined to the spindle 11a. This spindle 11a has one end supported by the shared end wall 33a of the casing 3 through the ball bearing 72 and its other end supported in the bore of the output shaft 21 of the reduction gear unit 2 through the roller bearing 73.

A radially reduced section of the spindle 11a is provided with teeth to form a sun gear 22 for the reduction gear unit 2. In this embodiment, therefore, the spindle 11a acts as both the motor shaft and the sun gear 22 of the reduction gear unit 2.

This reduction gear unit 2 is equipped with a pinion gear 23 meshing with the outer circumference of the aforementioned sun gear 22, and a ring gear 24 meshing with the outer circumference of the pinion gear 23. The ring gear 24 is held against rotation by being splined to the circumferential wall of the casing section 3b and is axially locked by a snap ring. A pinion shaft 25 supporting the pinion gear is fixed on a carrier 26 which is integral with the output shaft 21. This output shaft 21 is supported in bore portion 34b of the casing section 3b through a ball bearing 74 and a roller bearing 75.

A synchromesh joint 4 has its axial end splined in a stepped bore 27 and thereby held against rotation. The circumference of the synchromesh joint 4 is sealed in bore portion 34b of the casing section 3b by an oil seal 8.

This drive unit is further equipped in its casing section 3b with a phase sensor 5 and a lubrication system 6. The phase sensor 5 is constructed of a resolver which is driven by the rotation of a spur gear 51 meshing with a spur gear 13 fixed on the circumference of the spindle 11a. The resolver body is mounted on the outer side of the casing section 3b through a shaft 52 which is supported by ball bearings 76a and 76b. The lubrication system 6 is equipped with a spur gear 62, which meshes with the aforementioned spur gear 51 and is supported by the roller bearing 77 and thrust washers 78a and 78b, and a pump shaft which is connected to the aforementioned spindle through a one-way clutch 61. The pump shaft 63 is further connected to an oil pump motor 64 which is mounted on the outer side of the casing section 3b. A pump drive gear 105, for driving an oil pump 65, meshes with the spur gear 13 fixed on the spindle 11a through the spur gear 62 of the phase sensor 5. The oil discharged from the pump 65 is fed from an oil passage 39a formed in the casing and an external pipe to the individual components of the reduction gear unit 2 or the like by way of oil passage 34a, which is at the top of the drive unit when mounted on the car, oil ports 38a and 36b and an oil passage 37b. Finally, the oil is recovered in the oil sump which is formed by the outer wall 35a of the casing 3. The oil thus recovered in the oil sump is fed through a strainer 66 into a suction port 67 of the pump 65 to repeat the above-described circulation.

A parking brake 109 serves to lock the rotor shaft 311 to the casing 3.

In the drive unit thus far described, the rotation of the rotor 11 of each motor 1 is input to the reduction gear unit 2 from the sun gear 22 which is integral with the spindle 11a, and the reduced rotation of the carrier 26 produced by the pinion gear 23 and reaction force of the ring gear 24 are output via the output shaft 21 for transmission to the individual wheels through the synchromesh joint 4.

Figure 2:
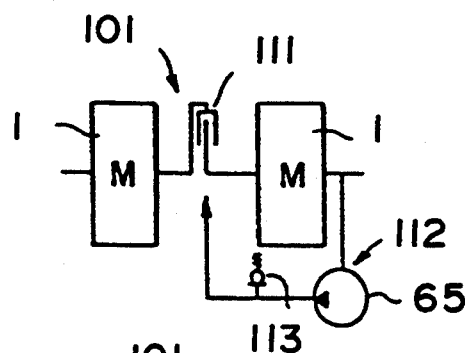
FIG. 2 is a schematic diagram showing a portion of the embodiment of FIG. 1 on an enlarged scale.
Figure 7:
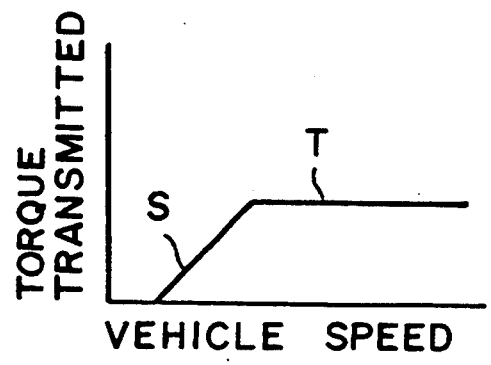
FIG. 7 is a graph of transmission torque versus vehicle speed for the first embodiment.

In the drive unit described above, a torque distributor 101 is interposed between the concentric right-hand and left-hand spindles 11a, although its specific construction is not shown in FIG. 1. FIG. 2 schematically shows the construction of the torque distributor 101 and its engaging force control means. In this embodiment, the torque distributor 101 is exemplified by a multiple disc clutch 111, and the engaging force control means, for controlling the clutch engaging force by feeding oil pressure to the servo of the multiple disc clutch 111, is exemplified by oil pressure controller 112. The source of oil pressure received by the oil pressure controller 112 is exemplified by the aforementioned oil pump 65, the discharge of which is partially fed, at a pressure controlled by a regulator valve 113, to the servo of the multiple disc clutch 111. In this torque distributor 101, the oil pump 65 establishes a discharge pressure according to the rotational speed of the motor 1 so that the transmission torque of the multiple disc clutch 111 rises in accordance with the running speed of the vehicle, as indicated by "S" in FIG. 7. The relief action of the regulator valve 113 produces a constant transmission torque at a plateau "T" in FIG. 7.

Figure 3:
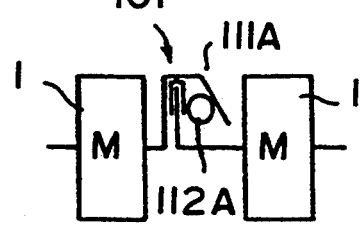
FIG. 3 is a schematic diagram showing the same portion of a second embodiment on an enlarged scale.

FIG. 3 schematically shows the construction of a second embodiment in which the torque distributor 101 is modified. In this embodiment, the torque distributor 101 is exemplified by a centrifugal weight actuation type clutch 111A. Thus, the means for controlling the clutch engaging force in accordance with the running state of the car is exemplified by a centrifugal weight 112A. Constant transmission torque can be achieved by attaching a limit mechanism to the weight. Transmission torque varying according to the running speed as in the first embodiment can be attained by this construction.

Figure 4:
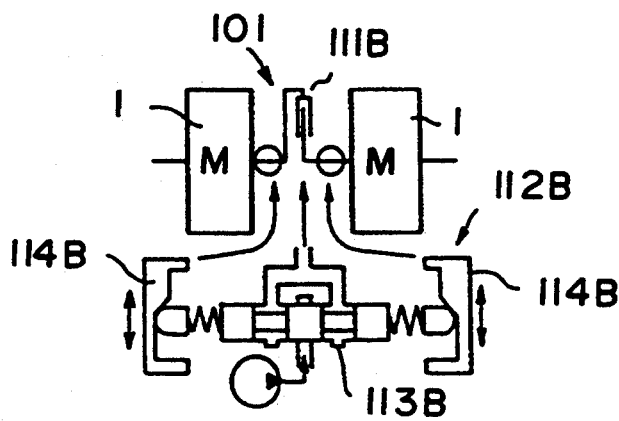
FIG. 4 is a schematic diagram showing the same portion of a third embodiment on an enlarged scale.

FIG. 4 schematically shows the construction of a torque distributor 101 of a third embodiment. A multiple disc clutch 111B is used as the torque distributor as in the first embodiment, but its engaging force control means 112B is exemplified by a valve 113B for regulating the feed pressure to the clutch 111B in accordance with movement of a detecting member 114B which is used as a control cam and moves in response to a change in the torque direction of the right-hand and left-hand motors 1.

Figure 5:
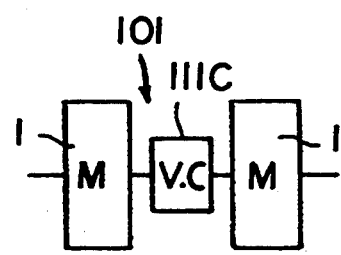
FIG. 5 is a schematic diagram showing the same portion of a fourth embodiment on an enlarged scale.
Figure 8:
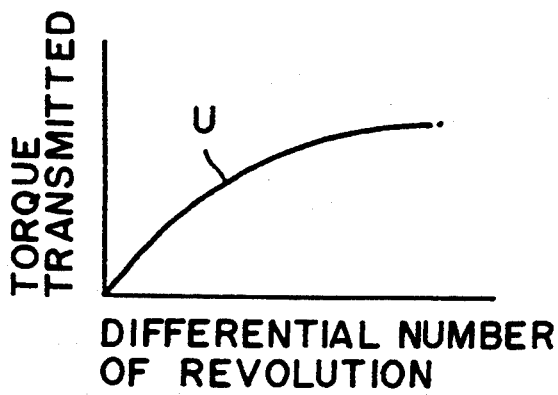
FIG. 8 is a graph plotting transmission torque against differential R.P.M. for the fourth embodiment.

FIG. 5 schematically shows the construction of the torque distributor 101 of a fourth embodiment. In this embodiment, the torque distributor 101 is exemplified by a viscous coupling 111C which is well known in the art for use in a four-wheel drive vehicle. In this case, the engaging force control means is built into the coupling mechanism itself, and the torque transmission is so changed by the differential rotation of the right-hand and left-hand wheels due to a change in the tire slip percentage that the transmission torque follows a curve having an upward convexity, as indicated by letter U in FIG. 8, when plotted against the differential rotation.

Figure 6:
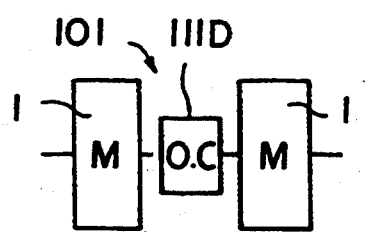
FIG. 6 is a schematic diagram showing the same portion of a fifth embodiment on an enlarged scale.
Figure 9:
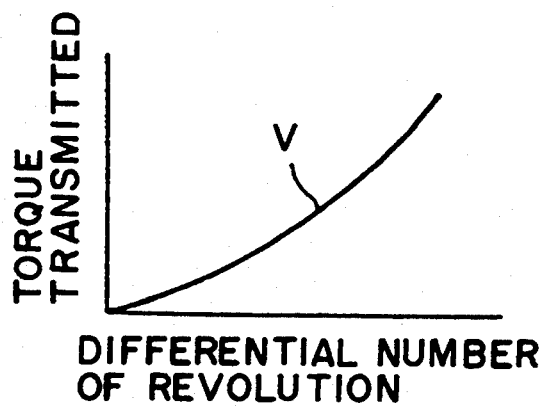
FIG. 9 is a graph plotting transmission torque against differential R.P.M. for the fifth embodiment.

FIG. 6 schematically shows the construction of the torque distributor 101 of a fifth embodiment. In this embodiment, the torque distributor 101 is exemplified by an orifice coupling 111D which is well known in the art for use in a four-wheel drive vehicle. In this embodiment, too, the engaging force control means is built into the coupling mechanism itself so that the torque transmission changes with the differential rotation due to change in the tire slip percentage. However, the transmission torque is different from that of the fifth embodiment in that it follows a curve having an upward concavity, as indicated by letter V in FIG. 9, when plotted against the differential rotation.

Figure 10:
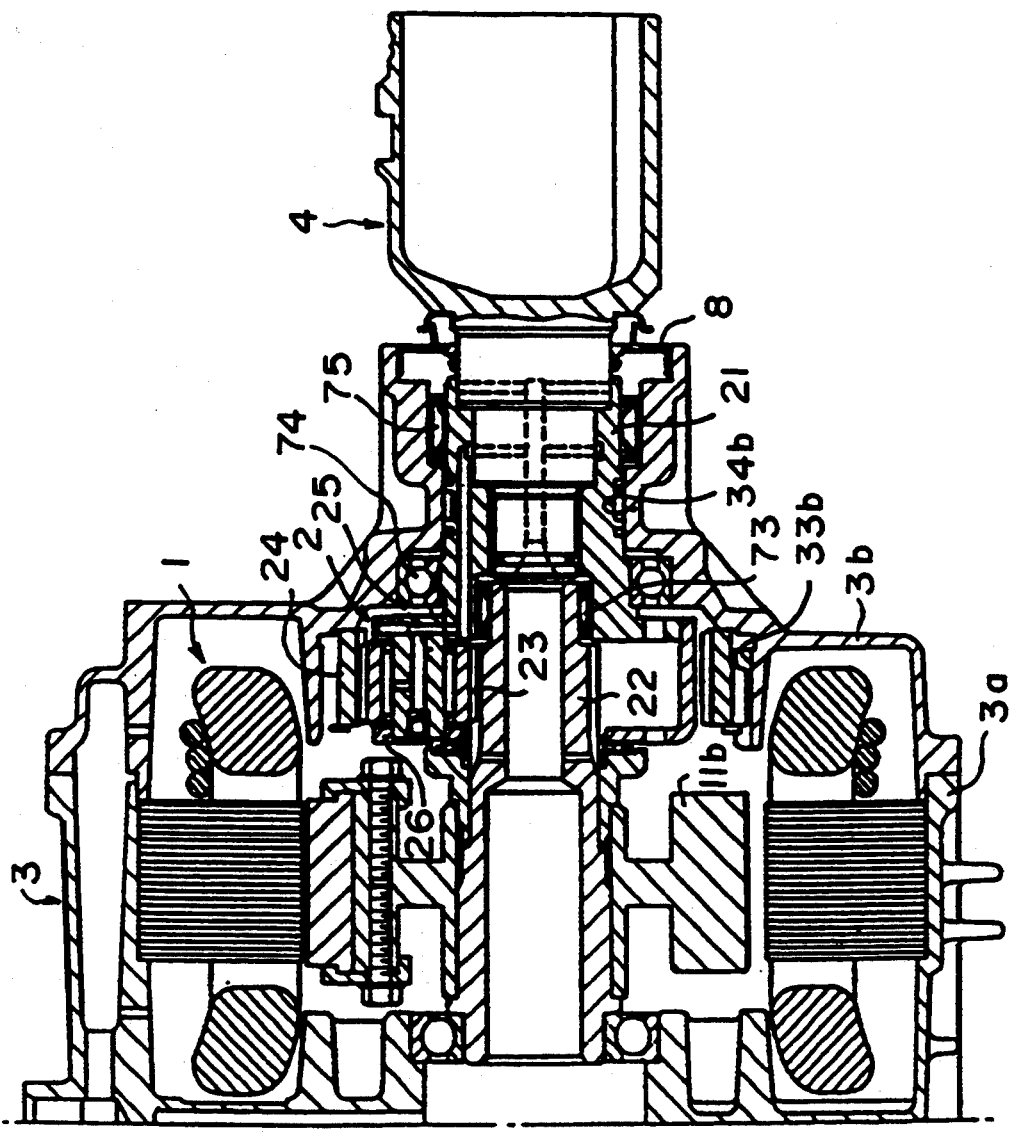
FIG. 10 is a cross-sectional view of the second embodiment of the present invention.

FIG. 10 shows an embodiment in which the axial length of the drive unit of the aforementioned embodiment is further shortened. In this embodiment, the position sensor 5 is omitted and rotor body 11b has its spindle shortened to allow the reduction gear unit mounting portion 33b to be positioned closer to the casing section 3a. The remaining construction is similar to that of the first embodiment and, accordingly, the common members have been designated by identical reference characters and their description omitted. The axial length of this embodiment can be shorter than that of the first embodiment.

The two embodiments thus far described have plural motors and their accompanying reduction gear units mounted in a single casing. However, the drive unit of the present invention is not limited to the aforementioned construction but can be modified by mounting the individual motors and reduction gear units in different casings. The mounting of the drive unit in the vehicle will be described in the following together with such modification.

Figure 11A:
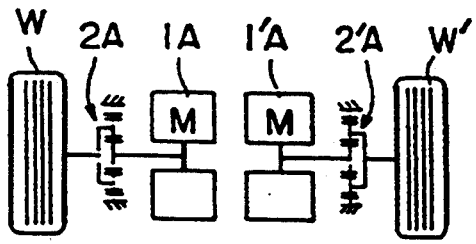
FIGS. 11A–11I are a series of skeletal diagrams showing various mounting arrangements in accordance with the present invention.

FIG. 11A shows an arrangement wherein left-hand and right-hand motors 1A and 1'A and reduction gear units 2A and 2'A are independently and separately connected to wheels W and W'. Of course, synchromesh joints, as described in the foregoing embodiments, can be interposed, if necessary, between the motors 1A and 1'A and the reduction gear units 2A and 2'A and the wheels W and W' (as in the following individual examples), although not shown. On the other hand, FIG. 11B shows an example in which the inner and outer directions of motors 1B and 1'B and reduction gear units 2B and 2'B with respect to the wheels W and W' are reversed from those of the arrangement of FIG. 11A.

The drive system of the present invention can also utilize an arrangement in which the left-hand and right-hand motors are connected to each other in a power transmitting manner. FIGS. 11C to 11I show examples of such an arrangement, in which a differential mechanism is added because the left-hand and right-hand motors are connected.

Figure 11B:
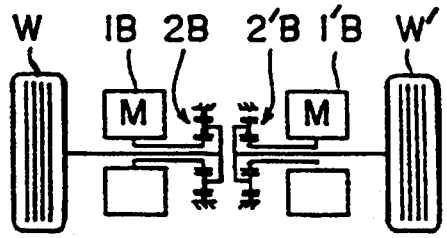
Figure 11C:
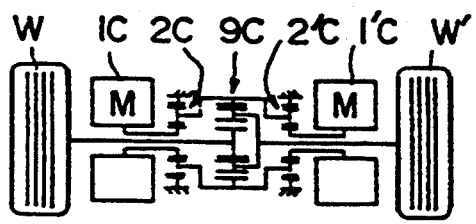
Figure 11D:
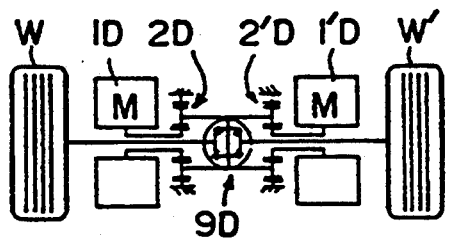

Illustrated in FIG. 11C is an example of a differential mechanism 9C composed of a double planetary gear mechanism interposed between reduction gear units 2C and 2'C arranged as in FIG. 11B. In this example, the carrier outputs of the left-hand and right-hand reduction gear units 2C and 2'C are connected to the ring gears of the planetary gearing of the differential mechanism 9C, and the sun gear and the carrier are connected to the left-hand and right-hand wheels W and W'. In FIG. 11D the differential mechanism of FIG. 11C is exemplified by an ordinary bevel gear type differential mechanism 9D.

Figure 11E:
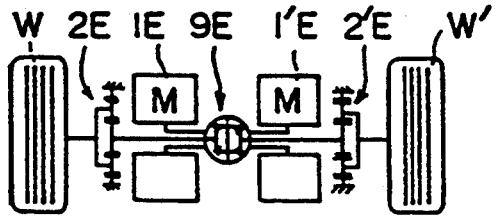
Figure 11F:
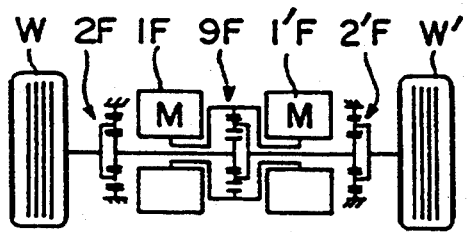
Figure 11G:
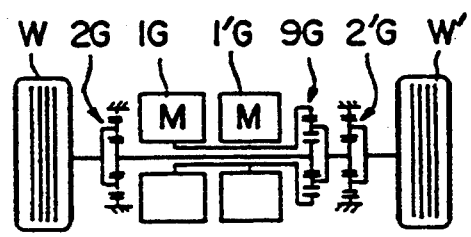
Figure 11H:
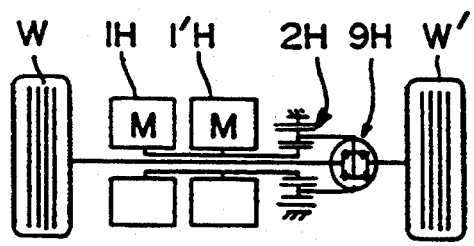
Figure 11I:
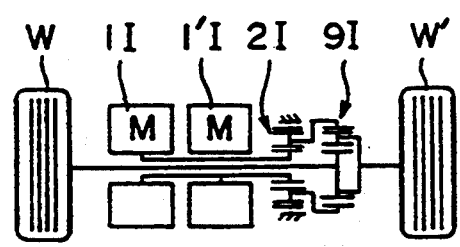

In FIG. 11E reduction gear units 2E and 2'E are moved from their positions shown in FIG. 11D to positions between motors 1E and 1'E and the wheels W and W'. In FIG. 11F the differential mechanism 9F is exemplified by a double planetary gear mechanism. In FIG. 11G the differential mechanism 9F of FIG. 11F is arranged outside of motors 1G and 1'G and is designated 9G.

Where the left-hand and right-hand motors are connected, a common shared reduction gear unit can be employed, as shown in FIGS. 11H and 11I. The embodiment of FIG. 11H has a bevel gear type differential mechanism 9H, and that of FIG. 11I has a double planetary type differential mechanism 9I.

Thus, the drive system of the present invention can be arranged in various modes axially aligned with the wheels so that it has excellent versatility in vehicle mounting arrangements.

Figure 12A:
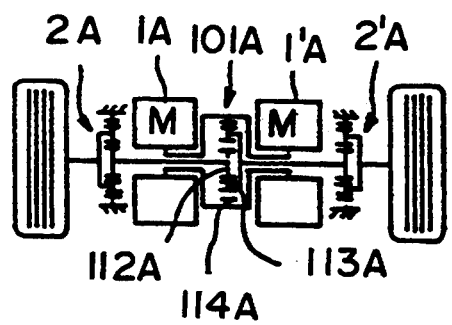
FIGS. 12A–12C are a series of skeletal diagrams showing various arrangements for the individual components, using two motors.
Figure 12B:
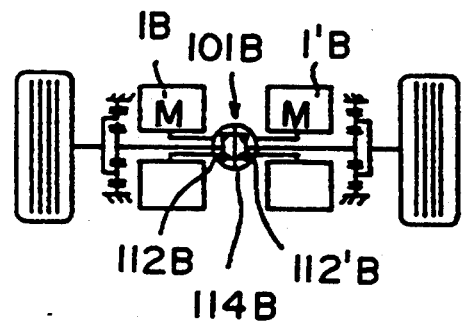
Figure 12C:
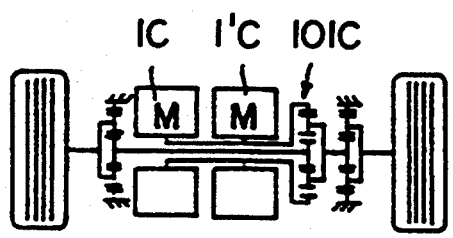

The torque distributor 101 can be replaced by a differential mechanism using an ordinary prior art gear train. The arrangement of the torque distributor and other components for such a modification are illustrated in FIGS. 12A–12C. The synchromesh joint is not shown but, of course, should be arranged in accordance with the supporting relationship of the individual components. FIG. 12A shows an arrangement in which the double planetary gear mechanism is exemplified by a torque distributor 101A. In this example, the motors 1A and 1'A are connected to a ring gear 114A of the torque distributor 101A. A sun gear 112A and a carrier 113A are output components connected to the left-hand and right-hand reduction gear units 2A and 2'A.

FIG. 12B shows an example in which the aforementioned torque distributor 101A is replaced by a bevel gear type torque distributor 101B. In this example, the motors 1B and 1'B are individually connected to the differential casing 114B of a torque distributor 101B, and side gears 112B and 112'B are individually connected to the left-hand and right-hand reduction gear units 2B and 2'B. In the example of FIG. 12C, a torque distributor 101C like the torque distributor 101A of the example FIG. 12A is arranged outside of left-hand and right-hand motors 1C and 1'C.

According to the two-motor arrangement of the aforementioned individual examples, an improvement in the driving efficiency is obtained, as compared with a system using only one motor, while the car is running under a light load.

Figure 13A:
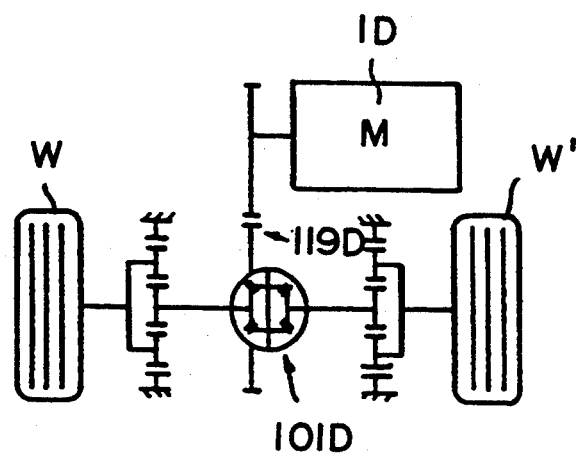
FIGS. 13A–13B are a pair of skeletal diagrams showing two different arrangements for individual components, using one motor.
Figure 13B:
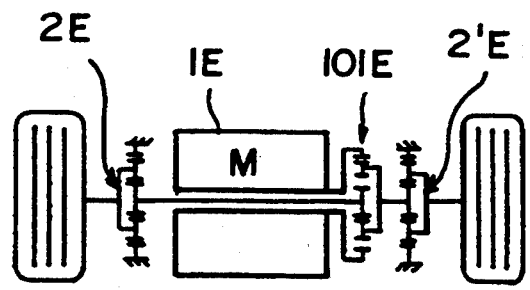

FIG. 13 shows an example of one-motor arrangement, in which the aforementioned left-hand and right-hand motors are united into one motor. In this arrangement, a motor 1D may be arranged in parallel with the axles of the wheels W and W' and connected to a torque distributor 101D through a counter gear 119D, as shown in FIG. 13A. In case of a single motor, moreover, if a torque distributor 101E composed of a double planetary gear mechanism is arranged at one side of motor 1E, as shown at (B) in FIG. 13, not only the motor 1E and the torque distributor 101E, but also the reduction gear units 2E and 2'E, can be arranged on a common axis.

Although the present invention has been exemplified by the foregoing embodiments, the arrangement of the individual components in the present invention should not be limited to the aforementioned, and individual components of the drive system may be suitably modified within the scope of the appended claims.

We claim:

1. A drive system for a wheeled electric vehicle comprising:
   a pair of drive wheels;
   a pair of electric motors, each motor having a stator, a roar and a rotor spindle on which said rotor is mounted, said rotor spindles being axially aligned;
   a pair of reduction gear means, each reduction gear means including planetary gearing and an output shaft for transmitting power from one of said motors to one of said drive wheels of the electric vehicle; and
   a single common casing, said motors and said pair of reduction gear means being mounted in said common casing, said common casing including:
      a pair of first sections, each of said first sections having a circumferential wall, to which said stator is fixed, and an end wall bearing a rotor spindle, said first sections being joined together at one end and each of said first sections having an opening at an end opposite said one end; and
      a pair of second sections, each of said second sections closing the opening of one of said first sections and supporting the output shaft of said reduction gear means.

2. A drive system for a wheeled electric vehicle according to claim 1, wherein said reduction gearing means comprises a pair of planetary gear sets, each of said planetary gear sets transmitting power from at least one of said plurality of electric motors to one of said output shafts.

3. A drive system for mounting on the chassis of an electric vehicle, said drive system comprising:
   right-hand and left-hand drive wheels, mounted on the chassis, for propelling the electric vehicle;
   a plurality of electric motors, each of said motors including rotors mounted on rotor spindles, the rotor spindles of two of said plurality of said motors being axially aligned with each other;
   engagement means for connecting said spindles to each other for rotation together; and
   engaging force control means for controlling the engaging force of said engagement means responsive to rotational speed of one of said electric motors.

4. A drive system in accordance with claim 3 wherein said engagement means is a multiple disk clutch operable by hydraulic pressure and wherein said engaging force control means controls said hydraulic pressure to said multiple disk clutch responsive to said rotation speed.

5. A drive system for a wheel in an electric vehicle comprising a pair of drive wheels, said drive system comprising:
   a plurality of electric motors, each motor driving a central spindle;
   a pair of output shafts for transmitting power from said drive unit to said pair of drive wheels;
   a plurality of reduction gear means, each coaxially mounted on one of said central spindles, for transmitting power from said central spindles to said pair of output shafts, said spindles and said shafts being mounted axially aligned with and between said pair of wheels of the electric vehicle; and
   a phase sensor and a gear unit, connecting said phase sensor to one of said electric motors, for transmitting rotation from said one electric motor to said phase sensor.

6. A drive system for mounting on the chassis of an electric vehicle, said drive system comprising:
   right-hand and left-hand drive wheels, mounted on the chassis, for propelling the electric vehicle;
   a plurality of electric motors, each of said motors including rotors mounted on rotor spindles, the rotor spindles of two of said plurality of said motors being axially aligned with each other;
   engagement means for connecting said spindles to each other for rotation together; and
   engaging force control means for controlling the engaging force of said engagement means responsive to a differential in rotation of said right-hand and left-hand drive wheels.

* * * * *

UNITED STATES PATENT AND TRADEMARK OFFICE
CERTIFICATE OF CORRECTION

PATENT NO. : 5,419,406
DATED : May 30, 1995
INVENTOR(S) : Kawamoto et al.

It is certified that error appears in the above-indentified patent and that said Letters Patent is hereby corrected as shown below:

On the title page, item [30], under foreign Data, "Foreign Application Priority Data", line 4, Mar. 10, 1992" should read --Mar. 19, 1992--.

Column 7, line 32, "roar" should read --rotor--.
Column 8, line 21, "rotation" should read --rotational--.

Signed and Sealed this

Thirty-first Day of October 1995

Attest:

BRUCE LEHMAN

Attesting Officer                    Commissioner of Patents and Trademarks